(12) United States Patent
Liu et al.

(10) Patent No.: US 12,333,075 B2
(45) Date of Patent: Jun. 17, 2025

(54) TOUCH DEVICE AND OPERATION METHOD FOR TOUCH DEVICE

(71) Applicants: Beijing BOE Technology Development Co., Ltd., Beijing (CN); BOE Technology Group Co., Ltd., Beijing (CN)

(72) Inventors: Xiaotong Liu, Beijing (CN); Xiaofeng Yin, Beijing (CN); Zhiming Yang, Beijing (CN); Jijing Huang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/790,376

(22) PCT Filed: May 31, 2021

(86) PCT No.: PCT/CN2021/097210
§ 371 (c)(1),
(2) Date: Jun. 30, 2022

(87) PCT Pub. No.: WO2022/252009
PCT Pub. Date: Dec. 8, 2022

(65) Prior Publication Data
US 2024/0176422 A1    May 30, 2024

(51) Int. Cl.
*G06F 3/01* (2006.01)
*G06F 3/041* (2006.01)

(52) U.S. Cl.
CPC ............ *G06F 3/016* (2013.01); *G06F 3/0412* (2013.01); *G06F 3/0416* (2013.01)

(58) Field of Classification Search
CPC ...................................................... G06F 3/016
See application file for complete search history.

(56) References Cited

U.S. PATENT DOCUMENTS

| | | | |
|---|---|---|---|
| 2009/0201268 A1* | 8/2009 | Endo | G01N 27/22 29/874 |
| 2011/0134061 A1* | 6/2011 | Lim | G06F 3/04883 345/173 |

(Continued)

FOREIGN PATENT DOCUMENTS

| | | |
|---|---|---|
| CN | 103019593 A | 4/2013 |
| CN | 103246379 A | 8/2013 |

(Continued)

OTHER PUBLICATIONS

PCT/CN2021/097210 international search report and written opinion.

*Primary Examiner* — Priyank J Shah
(74) *Attorney, Agent, or Firm* — IPro, PLLC

(57) ABSTRACT

A touch device is provided, including a touch rendering module, a touch module, a control module, and a driving module, wherein the touch rendering module is configured for enabling, after a user performs a touch operation, a touch interface to vibrate according to an initial driving voltage; the touch module is configured for obtaining a touch position and a touch area, and generating a touch signal; and the control module is configured for determining a changing trend of the touch area according to the touch signal, and generating a driving signal according to the changing trend of the touch area, to adjust the initial driving voltage to be an actual driving voltage. An operation method for the touch device is also provided.

19 Claims, 7 Drawing Sheets

(56) References Cited

U.S. PATENT DOCUMENTS

| | | | |
|---|---|---|---|
| 2015/0261296 A1 | 9/2015 | Yoshikawa | |
| 2017/0255269 A1 | 9/2017 | Yang et al. | |
| 2018/0095582 A1 | 4/2018 | Hwang et al. | |
| 2020/0097086 A1* | 3/2020 | Bushnell | H10N 30/20 |
| 2022/0147187 A1* | 5/2022 | Tsangarides | G06F 3/0446 |
| 2022/0197462 A1* | 6/2022 | Kemppinen | G06F 3/016 |

FOREIGN PATENT DOCUMENTS

| | | |
|---|---|---|
| CN | 105302373 A | 2/2016 |
| CN | 107887407 A | 4/2018 |

\* cited by examiner

TOUCH DEVICE AND OPERATION METHOD FOR TOUCH DEVICE

CROSS-REFERENCE TO RELATED APPLICATION

The present application is the U.S. national phase of PCT Application No. PCT/CN2021/097210 filed on May 31, 2021, which is incorporated herein by reference in its entirety.

TECHNICAL FIELD

The present disclosure relates to the field of touching technology, and more particularly, to a touch device and an operation method for the touch device.

BACKGROUND

Currently, there is a tactile representation technique using the principle of the air squeeze film effect. Generally, in such a tactile representation technique, it sets a to-be-rendered virtual object in advance, and controls, after detecting a touch operation by a user, a vibration unit at the position corresponding to the touch operation, so as to realize a vibration corresponding to the virtual object, and thus the user may sense a touch on the virtual object when performing the touch operation.

In the tactile representation technical solution based on the squeeze film effect of the prior art, a fixed driving voltage value and a fixed driving signal are set. When a user's finger performs the touch action, the fixed driving voltage is generated through a driving module, so that the user feels a tactile information. However, the tactile sensation threshold varies for different users. For example, a user A may sense a tactile signal during touching. However, for a user B, since the finger of the user B is not sensitive enough, the corresponding tactile signal cannot be sensed by the user B during the touch, and the driving signal needs to be adjusted to enable the user B to sense the tactile information. (The driving voltage is different, the amplitude of the tactile representation device based on the squeeze film effect is different, and the tactile sensation of the user performing touch is different). However, the current tactile representation device does not have a real-time adjustment scheme with respect to the respective tactile sensation thresholds of different users.

SUMMARY

In order to solve the above-mentioned technical problem, the present disclosure provides a touch device and an operation method thereof, which solve the problem that the tactile representation device cannot be adjusted in real-time according to the difference of the user's tactile sensation threshold.

To achieve the above object, the technical solution employed by embodiment of the present disclosure provides a touch device including a touch rendering module, a touch module, a control module, and a driving module, wherein the touch rendering module is configured for enabling, after a user performs a touch operation, a touch interface to vibrate according to an initial driving voltage;
the touch module is configured for obtaining a touch position and a touch area, and generating a touch signal; and the control module is configured for determining a changing trend of the touch area according to the touch signal, and generating a driving signal according to the changing trend of the touch area, to adjust the initial driving voltage to be an actual driving voltage.

Optionally, the control module includes:
a determination unit, configured for determining the changing trend of the touch area according to the touch signal;
a driving signal generating unit, configured for generating the driving signal according to the determination result of the determination unit, wherein when the determination result is that the changing trend of the touch area is increasing over time, and the touch area increases, the driving signal is generated, to enable the initial driving voltage to increase by a first preset value and be adjusted to be the actual driving voltage; when the determination result is that the changing trend of the touch area is increasing over time, and the touch area decreases, the driving signal is generated, to enable the initial driving voltage to decrease by a second preset value and be adjusted to be the actual driving voltage.

Optionally, the vibration amplitude Am of touch interface is obtained through a following formula: $Am=B*Vac-C$, where the driving voltage of the touch rendering module is Vac, and B and C are preset coefficients.

Optionally, the actual driving voltage $V(t_2)$ is obtained through a following formula:

$$Vac(t_2)=E*(S1-S0)+Vac(t_1);$$

wherein $Vac(t_2)$ is voltage value of Vac at a second moment $t_2$; $Vac(t_1)$ is voltage value of Vac at a first moment $t_1$; D and E are respective preset coefficients; S0 is touch area at the first moment $t_1$; S1 is touch area at the second moment $t_2$; $t_2=t_1+n$ seconds; $t_1$ is a natural number; $n \geq 1$.

Optionally, the vibration amplitude Am of touch interface is obtained through a following formula: $Am=A*Vdc+B*Vac-C$, where the driving voltage of the touch rendering module is Vdc+Vac, and A, B and C are preset coefficients.

Optionally, the actual driving voltage $V(t_2)$ is obtained through following formulas:

$$V(t_2)=Vdc(t_2)+Vac(t_2);$$

$$Vdc(t_2)=D*(S1-S0)+Vdc(t_1);$$

$$Vac(t_2)=E*(S1-S0)+Vac(t_1);$$

wherein $Vdc(t_2)$ is a voltage value of the Vdc at the second moment $t_2$, $Vdc(t_1)$ is a voltage value of the Vdc at the first moment $t_1$, $Vac(t_2)$ is a voltage value of the Vac at the second moment $t_2$, $Vac(t_1)$ is a voltage value of the Vac at the first moment $t_1$, D and E are respective preset coefficients, S0 represents the touch area at the first moment $t_1$, S1 represents the touch area at the second moment $t_2$, $t_2=t_1+n$ seconds, $t_1$ is a natural number, and $n \geq 1$.

Optionally, the touch device includes a touch screen, wherein the touch screen includes a cover plate, and the touch module and the touch rendering module that are arranged on the cover plate, and the touch rendering module is arranged at at least one side of the touch module along a first direction.

Optionally, the touch rendering module includes a piezoelectric structure, the piezoelectric structure includes a first electrode, a piezoelectric layer and a second electrode, and the first electrode, the piezoelectric layer and the second electrode are laminated sequentially in that order along a direction away from the cover plate.

Optionally, the touch rendering module includes a piezoelectric structure, and the piezoelectric structure includes a first electrode, a piezoelectric layer and a second electrode which are laminated sequentially in that order along a direction away from the cover plate, and an insulating layer covering at a side of the first electrode and the second electrode away from the cover plate, the area of the orthographic projection of the first electrode onto the cover plate is greater than the area of the orthographic projection of the piezoelectric layer on the cover plate, the area of the orthographic projection of the piezoelectric layer onto the cover plate is greater than the area of the orthographic projection of the second electrode onto the cover plate, the piezoelectric structure further includes a first wire and a second wire, the first wire is connected to the first electrode through a via hole arranged in the insulating layer, and a second wire is connected to the second electrode through a via hole arranged in the insulating layer.

Optionally, the touch rendering module includes a plurality of the piezoelectric structures spaced apart from each other in a second direction perpendicular to the first direction.

Optionally, the touch device further includes a display module, wherein the touch module is integrated into the display module, or the touch module is arranged between the cover plate and the display module.

Optionally, the touch module includes a first optical adhesive layer, a first touch electrode, a first insulating layer, a second optical adhesive layer, a second touch electrode, and a second insulating layer arranged sequentially in that order along a direction away from the cover plate.

Optionally, the touch module includes a first optical adhesive layer, a first touch electrode, a first insulating layer, a second optical adhesive layer, and a second touch electrode that are arranged sequentially in that order along a direction away from the cover plate.

Optionally, the touch module includes a first touch electrode, a fourth optical adhesive layer, a second touch electrode, and a third insulating layer that are arranged sequentially in that order along a direction away from the cover plate.

Optionally, the touch module includes a first touch electrode, a fourth insulating layer, and a second touch electrode that are arranged sequentially in that order along a direction away from the cover plate.

Optionally, the touch module includes a touch electrode layer arranged on the cover plate.

The present disclosure further provides an operation method for the above-mentioned touch device, including the following steps:
 vibrating, according to the initial driving voltage, the touch interface after the user performs the touch operation;
 obtaining the touch position and the touch area, and generating the touch signal; and
 determining the changing trend of the touch area according to the touch signal, and generating the driving signal according to the changing trend of the touch area, to adjust the initial driving voltage to be the actual driving voltage.

Optionally, the determining the changing trend of the touch area according to the touch signal, and generating the driving signal according to the changing trend of the touch area, to adjust the initial driving voltage to be the actual driving voltage includes:
 determining the changing trend of the touch area according to the touch signal;
 generating the driving signal according to the determination result of the determination unit, wherein when the determination result is that the changing trend of the touch area is increasing over time, and the touch area increases, the driving signal is generated, to enable the initial driving voltage to increase by a first preset value and be adjusted to be the actual driving voltage; when the determination result is that the changing trend of the touch area is increasing over time, and the touch area decreases, the driving signal is generated, to enable the initial driving voltage to decrease by a second preset value and be adjusted to be the actual driving voltage.

Advantageous effects of the present disclosure are as follows: detecting the touch area through the touch module so as to detect the touch force, adjusting in real time the driving voltage of touch rendering module for driving the touch interface to vibrate, so as to achieve the effect of internal compensation, adjusting the touch feeling in real time and improving the user experience. In addition, the touch module further serves as a force detection module, such that an independent force detection module is not required, and thus the touch feeling of touch rendering module can be adjusted and the size of the device can be reduced.

DETAILED DESCRIPTION

Figure 1:
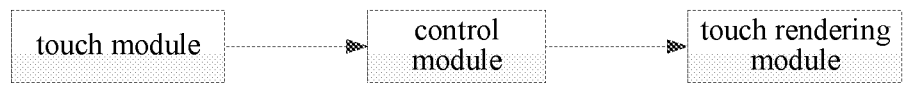
FIG. 1 shows a block diagram of the touch device according to the embodiment of the present disclosure.

For the purpose of clarifying the objects, technical solution and advantages of the embodiment of the present disclosure, a clear and complete description of the technical solution of the embodiment of the present disclosure will be provided in connection with the accompanying drawings of the embodiment of the present disclosure. It is evident that the described embodiments are parts of the embodiments of the present disclosure, instead of all the embodiments. Based on the described embodiments of the present disclosure, all other embodiments obtained by one of ordinary skill in the art fall within the range of the present disclosure.

In describing the present disclosure, it should be noted that the orientation or position relationships indicated by the terms "central", "upper", "lower", "left", "right", "vertical", "horizontal", "inner", "outer", and the like are based on the orientation or position relationships shown in the drawings and are merely for convenience in describing and simplifying the present disclosure and do not indicate or imply that the referenced device or element must have a particular orientation, be constructed and operated in a particular orientation and, therefore, are not to be construed as limiting the present disclosure. Furthermore, the terms "first", "second", and "third" are configured for descriptive purposes only and are not to be construed as indicating or implying relative importance.

In traditional tactile representation technical solution based on squeeze film effect, a fixed driving voltage value and a fixed driving signal are set. When a person's finger performs a touch action, a fixed driving voltage is generated through the driving module, so that a user feels a tactile information. However, the tactile sensation threshold varies for different users. By observing with respect to the user's tactile experience, when a user's finger touches the surface of the tactile representation product, some users' tactile sensations are more sensitive and some other users' tactile sensations are less sensitive. If the driving voltage is set to be low, some users can experience the tactile signal; in the case that some users have low tactile sensitivity, the tactile experience of them is poor, and the tactile signal cannot be sensed with respect to such setting; if the driving voltage is set to be high, the user with low tactile sensitivity can also experience better tactile sensation; however, for the user with high tactile sensitivity, the tactile sensation will be too high, thus reducing the experience. When these tactile-insensitive users perform the touch operation, they will increase the touch force unconsciously during the touch, and the touch area of the contact surface of the finger with the tactile representation device is increased. In order to solve the problem that the conventional tactile representation device does not have a scheme for adjusting the tactile sensations in real time according to different user tactile sensations (threshold), resulting in a poor tactile experience of a user with low tactile sensitivity, the present disclosure provides in some embodiments a touch device, including touch rendering module, touch module, control module and driving module, with reference to FIG. 1, where the touch rendering module is configured for enabling, after a user performs a touch operation, a touch interface to vibrate according to an initial driving voltage;

the touch module is configured for obtaining a touch position and a touch area, and generating a touch signal; and the control module is configured for determining a changing trend of the touch area according to the touch signal, and generating a driving signal according to the changing trend of the touch area, to adjust the initial driving voltage to be an actual driving voltage.

A touch area is detected by the touch module so as to detect a touch strength, and the control module determines a changing trend of the touch area according to the touch signal, and generates a driving signal according to the changing trend of the touch area so as to adjust the initial driving voltage to be the actual driving voltage. Increasing the driving voltage of the touch rendering module or decreasing the driving voltage of the touch rendering module according to the change of the touch strength when the user performs the touch operation (when the driving voltage increases, and the touch rendering module operates based on the film pressing effect, the vibration amplitude of the touch interface increases, and the touch sense increases; in contrast, when the driving voltage decreases, and the touch rendering module operates based on the squeeze film effect, the vibration amplitude of the touch interface decreases, and the touch sense decreases); adjusting in real time the driving voltage in the touch rendering module for driving the touch interface to vibrate, so as to achieve the effect of internal compensation, adjusting in real time the touch feeling and improving the user experience. In addition, the touch module further serves as a force detection module, such that an independent force detection module is not required, and thus the touch feeling of the touch rendering module can be adjusted and the size of the device can be reduced.

Optionally, in this embodiment, the control module includes:

a determination unit, configured for determining the changing trend of the touch area according to the touch signal;

a driving signal generating unit, configured for generating the driving signal according to the determination result of the determination unit, wherein when the determination result is that the changing trend of the touch area is increasing over time, and the touch area increases, then the driving signal is generated, to enable the initial driving voltage to increase by a first preset value and be adjusted to be the actual driving voltage; when the determination result is that the changing trend of the touch area is increasing over time, and the touch area decreases, and then the driving signal is generated to enable the initial driving voltage to decrease by a second preset value and be adjusted to be the actual driving voltage.

When the user performs the touch operation, the touch rendering module vibrates the touch interface according to the initial driving voltage, and the touch module is configured for detecting the touch position and the touch area and generating the touch signal; the control module determines the changing trend of the touch area according to the touch signal, generates a driving signal according to the changing trend of the touch area, and outputs the driving signal to the touch rendering module, to enabling the touch rendering module to vibrate the touch interface according to the actual driving voltage to adjust the vibration amplitude, so as to implement the adjustment of the vibration amplitude according to the user's different tactile sensation threshold and improve the tactile sensation experience.

By adjusting the drive voltage of the touch rendering module to adjust the vibration amplitude of the touch interface to adjust the feel, in this embodiment, the vibration amplitude Am of the touch interface is obtained by the following formula: Am=B*Vac−C, where the driving voltage of the touch rendering module is Vac, and B and C are preset coefficients. Vac is an alternating current voltage and C is the initial voltage value that causes the touch interface to vibrate.

Optionally, in this embodiment, the actual driving voltage $V(t_2)$ is obtained through a following formula:

$$Vac(t_2)=E*(S1-S0)+Vac(t_1);$$

where $Vac(t_2)$ is a voltage value of Vac at a second moment $t_2$; $Vac(t_1)$ is voltage value of Vac at a first moment $t_1$; D and E are respective preset coefficients; S0 is the touch area at the first moment $t_1$; S1 is the touch area at the second moment $t_2$; $t_2=t_1+n$ seconds; $t_1$ is a natural number; and n≥1.

The principle of using the air squeeze film effect to render the tactile effect is that: the air squeeze film effect is a result of the interaction of the viscosity and compressibility of the air molecules, applying an alternating electrical signal to one of the relatively parallel surfaces, enabling the surface to vibrate forcibly (forming a specific vibration waveform, such as a sinusoidal wave). When an operator's finger is located above a support plate subjected to the forced vibration (such as a touch cover plate of the touch device, i.e., touch interface), due to the high-frequency vibration of the support plate, the air molecules between the two are periodically squeezed, and the air molecules cannot escape in time during the vibration cycle, so that a high-pressure air film of a certain thickness is generated between the two surfaces (the finger and the support plate), thereby changing the friction coefficient of the touch area through the air film. In conjunction with the formula described above, the vibration amplitude of the touch interface can be adjusted by adjusting the driving voltage to adjust the tactile sensation.

In an embodiment of this embodiment, the driving voltage of the touch rendering module superimposes the direct current voltage Vdc on the basis of the alternating current voltage Vac, so that the vibration amplitude of the touch interface can be further effectively adjusted, that is, compared with the driving mode with only the alternating current voltage Vac, when the tactile sensation needs to be enhanced, the superimposition of the direct current voltage Vdc enables the vibration amplitude to be more effectively increased and the tactile sensation to be stronger. On this basis, the vibration amplitude Am of the touch interface is obtained through a following formula: Am=A*Vdc+B*Vac−C, where the driving voltage of the touch rendering module is Vdc+Vac, A, B and C are preset coefficients, Vdc is a direct current voltage, Vac is an alternating current voltage, and C is an initial voltage value which causes the touch interface to generate vibration.

Optionally, in this embodiment, the actual driving voltage $V(t_2)$ is obtained through following formulas:

$$V(t_2)=Vdc(t_2)+Vac(t_2);$$

$$Vdc(t_2)=D*(S1-S0)+Vdc(t_1);$$

$$Vac(t_2)=E*(S1-S0)+Vac(t_1);$$

where $Vdc(t_2)$ is a voltage value of the Vdc at the second moment $t_2$, $Vdc(t_1)$ is a voltage value of the Vdc at the first moment $t_1$, $Vdc(t_2)$ is a voltage value of the Vac at the second moment $t_2$, $Vdc(t_1)$ is a voltage value of the Vac at the first moment $t_1$, D and E are respective preset coefficients, S0 represents the touch area at the first moment $t_1$, S1 represents the touch area at the second moment $t_2$, $t_2=t_1+n$ seconds, $t_1$ is a natural number, and n≥1.

It should be noted that the value of n can be set according to actual needs, and the time for a user to perform a touch operation is typically short; therefore, for example, the value of n is 1 second, but the present disclosure is not limited thereto.

It should be noted that the drive voltage of the touch rendering module can be adjusted by adjusting the voltage value of the Vdc or the Vac separately, so as to adjust the vibration amplitude of the touch interface, or the voltage values of the Vdc and the Vac can be adjusted at the same time, so as to adjust the vibration amplitude of the touch interface, and the specific adjustment method can be set according to actual needs.

Figure 11:
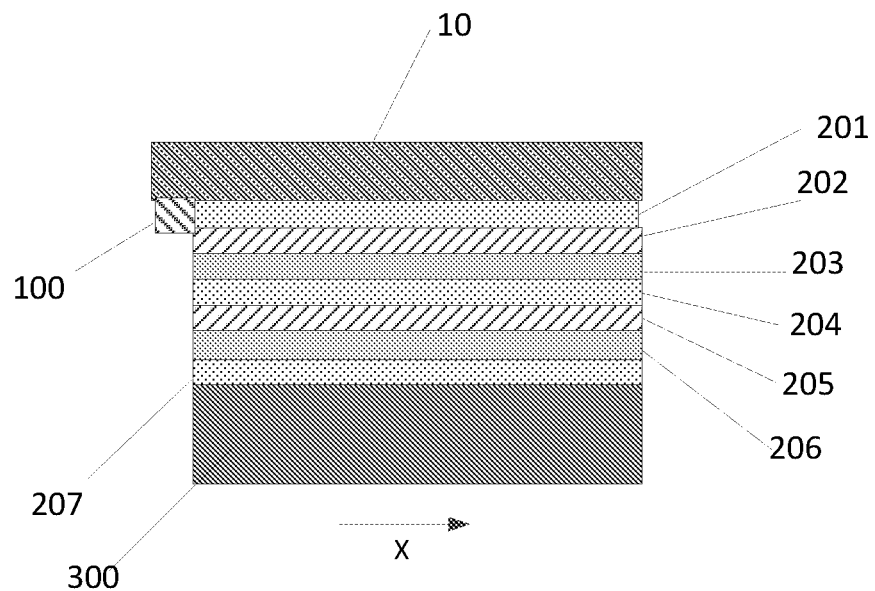
FIG. 11 is a first schematic diagram for the integrated structure of the touch rendering module and the touch module according to an embodiment of the present disclosure.

Optionally, in this embodiment, the touch device includes a touch screen, the touch screen includes a cover plate 1, and the touch module and the touch rendering module 100 are provided on the cover plate 1, the touch rendering module 100 provided at at least one side of the touch module along the first direction (referring to an X direction in FIG. 11).

Figure 20:
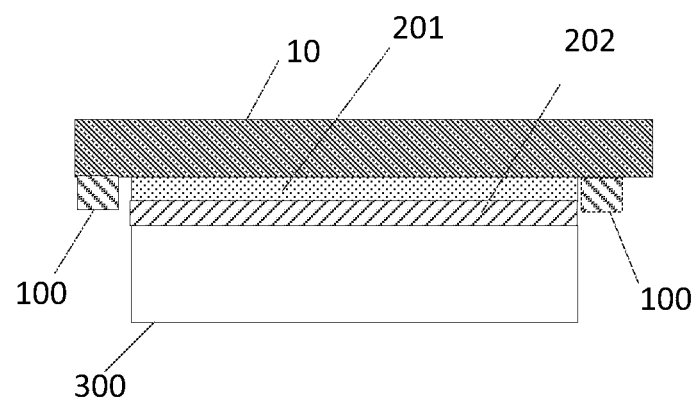
FIG. 20 is a tenth schematic diagram for the integrated structure of the touch rendering module and the touch module according to an embodiment of the present disclosure.

Optionally, in this embodiment, the touch rendering module 100 is arranged at one side of the touch module along the first direction, as shown in FIGS. 11-19; and in another embodiment, the touch rendering module 100 is arranged at two opposite sides of the touch module along the first direction, as shown in FIG. 20.

Figure 2:
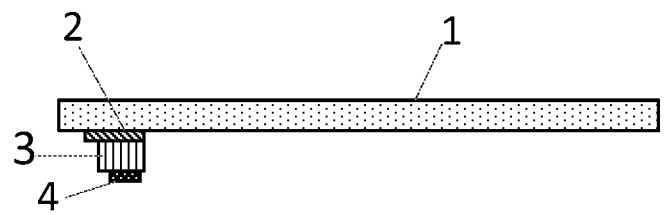
FIG. 2 is a first schematic diagram for the touch rendering module according to an embodiment of the present disclosure.
Figure 3:
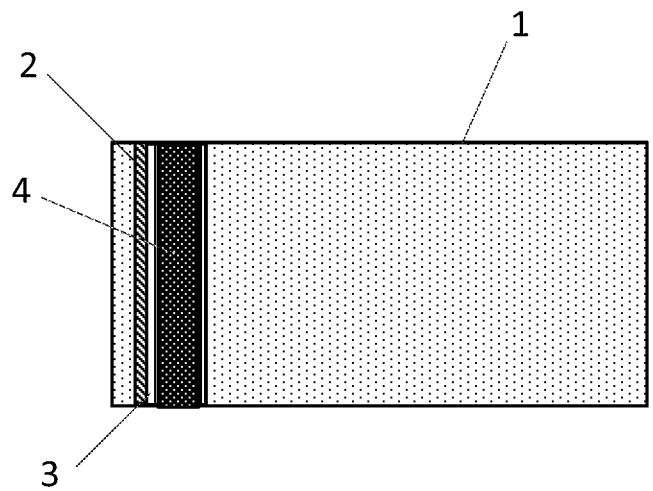
FIG. 3 is a second schematic diagram for the touch rendering module according to an embodiment of the present disclosure.

Referring to FIGS. 2 and 3, a touch rendering module 100 in this embodiment includes a piezoelectric structure including a first electrode 2, a piezoelectric layer 3 and a second electrode 4 laminated sequentially in that order along a direction away from the cover plate 1.

With reference to FIGS. 4-7, in this embodiment, the touch rendering module 100 includes a piezoelectric structure, the piezoelectric structure includes a first electrode 2, a piezoelectric layer 3, and a second electrode 4 laminated sequentially in that order along a direction away from the cover plate 1, and insulating layers 5 covering sides of the first electrode 2 and the second electrode 4 away from the cover plate 1, where the area of the orthographic projection of the first electrode 2 on the cover plate 1 is greater than the area of the orthographic projection of the piezoelectric layer 3 on the cover plate 1, the area of the orthographic projection of the piezoelectric layer 3 on the cover plate 1 is greater than the area of the orthographic projection of the second electrode 4 on the cover plate 1, the piezoelectric structure further includes a first wire 6 connected to the first electrode 2 and a second wire 7 connected to the second electrode 4 through respective via holes arranged in the insulating layer 5.

Figure 4:
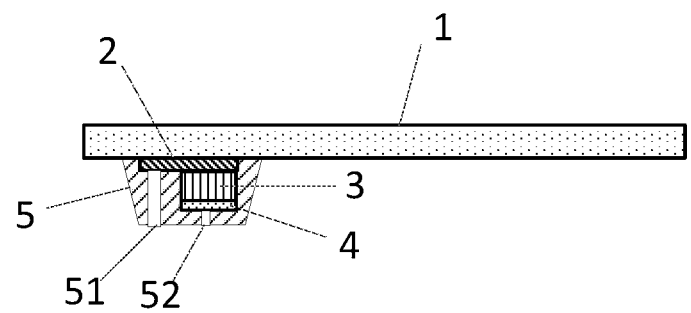
FIG. 4 is a third schematic diagram for the touch rendering module according to an embodiment of the present disclosure.
Figure 5:
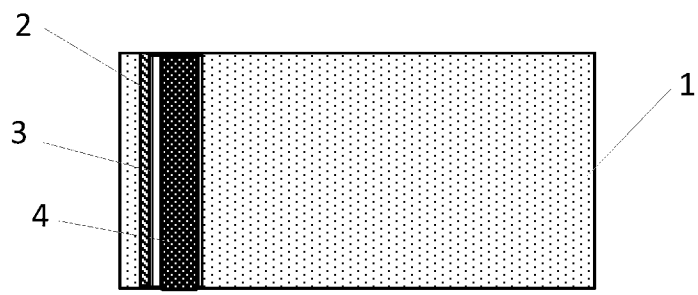
FIG. 5 is a schematic diagram for the touch rendering module of FIG. 4 with the insulating layer being removed.
Figure 6:
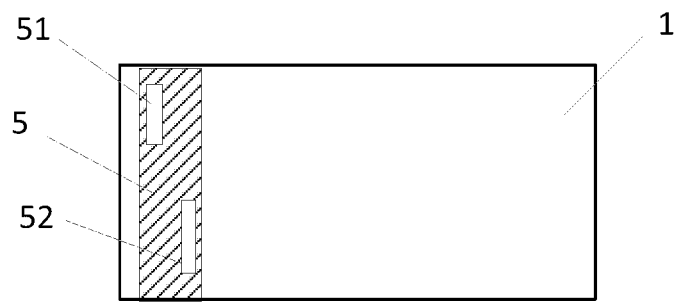
FIG. 6 is a schematic diagram for the distribution of via holes on the insulating layer of the touch rendering module of FIG. 4.
Figure 7:
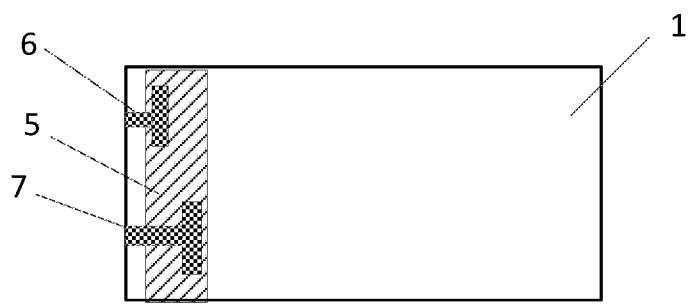
FIG. 7 is a schematic diagram for the arrangement of the first wire and the second wire in the touch rendering module of FIG. 4.

The first wire 6 and the second wire 7 are not shown in FIG. 4, the insulating layer 5 is not shown in FIG. 5, the first via hole 51 corresponding to the first wire 6 and the second via hole 52 corresponding to the second wire 7 on the insulating layer 5 are shown in FIG. 6, and the first wire 6 and the second wire 7 are shown in FIG. 7.

In this embodiment, the cover plate 1 may be made of material such as glass, ABS plastic, polycarbonate plate, etc.

In this embodiment, the piezoelectric layer 3 may be a piezoelectric sheet or a piezoelectric film. When the piezoelectric layer is a piezoelectric sheet, the insulating layer, the first wire, and the second wire may be omitted, as shown in FIGS. 2 and 3.

Figure 8:
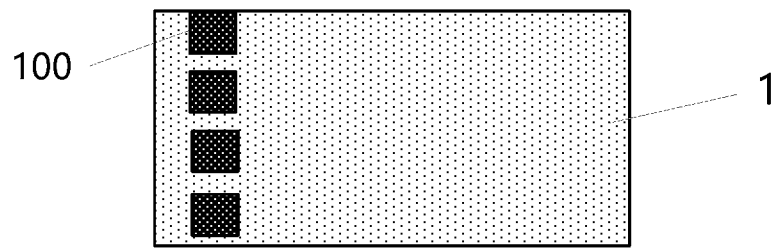
FIG. 8 is a first schematic diagram for the distribution of the piezoelectric structure according to an embodiment of the present disclosure.
Figure 9:
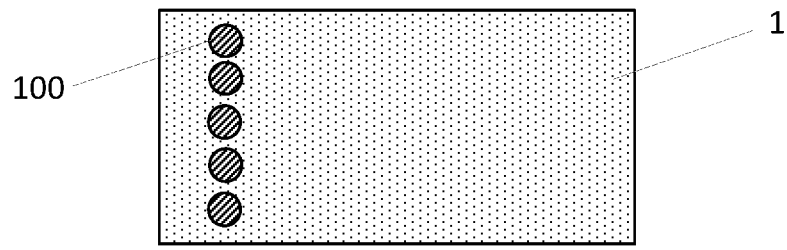
FIG. 9 is a second schematic diagram for the distribution of the piezoelectric structure according to an embodiment of the present disclosure.
Figure 10:
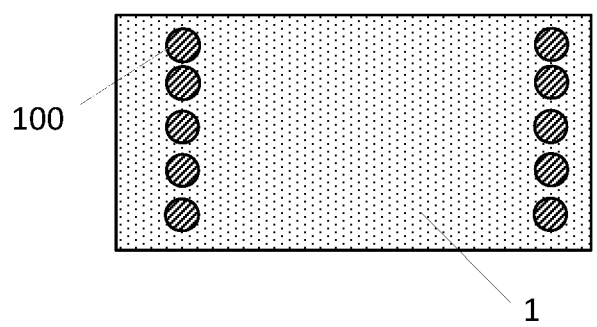
FIG. 10 is a third schematic diagram for the distribution of the piezoelectric structure according to an embodiment of the present disclosure.

In this embodiment, the pattern of the piezoelectric structure can be a rectangle, or can be composed of n circles, n rectangles, n squares, as shown in FIGS. 8-10. The position of the piezoelectric structure can also be distributed at one or both ends of the cover plate 1, as shown in FIGS. 9 and 10.

For the material of the first electrode 2, the second electrode 4, the first wire 6, the second wire 7, it can be conductive material such as gold, copper, silver, Indium Tin Oxide (ITO), Pt, Mo, etc.

The insulating layer 5 may be an insulating material such as SU8, silicon oxide, silicon nitride, etc.

In this embodiment, a plurality of the touch rendering modules 100 are spaced apart on the cover plate 1 along a second direction perpendicular to the first direction.

Referring to FIGS. 8-10, the touch rendering modules 100 may be arranged in one or two columns on the cover plate 1 along the second direction.

Optionally, in this embodiment, the touch device further includes a display module 300, the touch module is integrated within the display module 300 (see FIG. 19), or the touch module is located between the cover plate 1 and the display module 300 (see FIGS. 11-18 and 20).

The specific structure of the touch module can be various, and several structures of the touch module integrated within the touch rendering module in this embodiment are shown in FIGS. 11-20.

Figure 12:
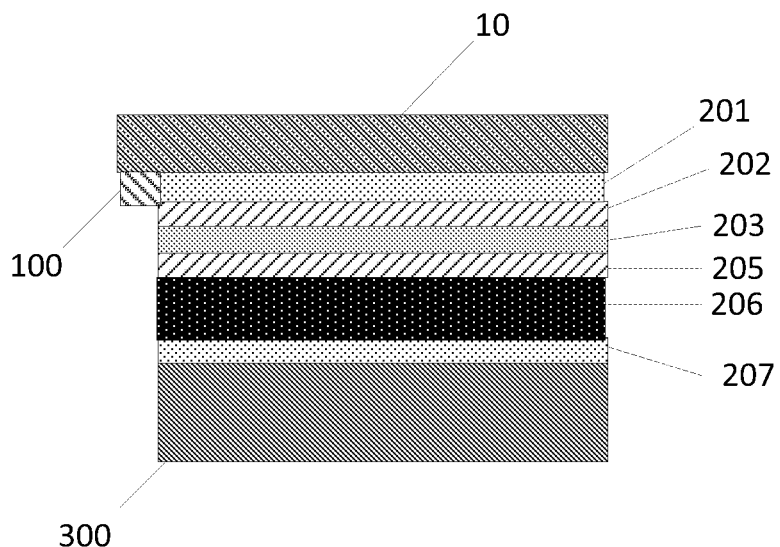
FIG. 12 is a second schematic diagram for the integrated structure of the touch rendering module and the touch module according to an embodiment of the present disclosure.

Referring to FIGS. 11 and 12, in this embodiment, the touch module includes a first optical adhesive layer 201, a first touch electrode 202, a first insulating layer 203, a second optical adhesive layer 204, a second touch electrode 205, and a second insulating layer 206 arranged sequentially along a direction away from the cover plate 1.

The touch module is connected to the display module 300 via a third optical adhesive layer 207.

The materials of the first insulating layer 203 and the second insulating layer 206 may be the same or different, for example, in FIG. 11, the first insulating layer 203 and the second insulating layer 206 are both PET films, and in FIG. 12, the second insulating layer 206 is glass.

Figure 13:
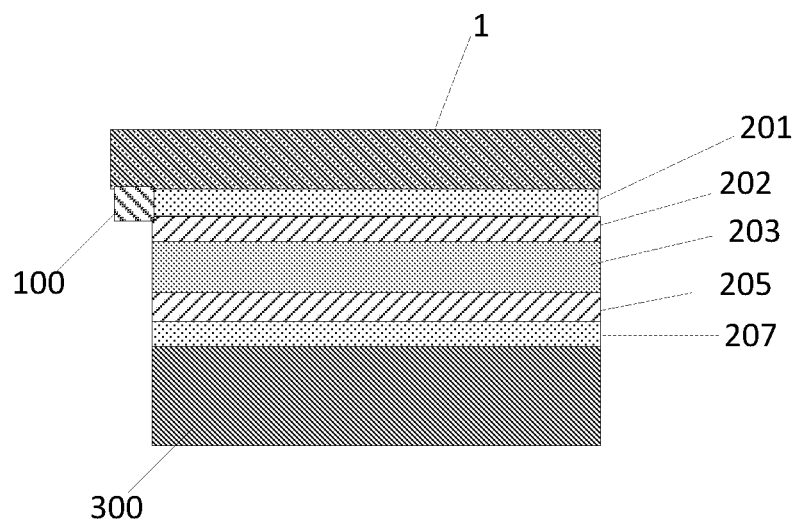
FIG. 13 is a third schematic diagram for the integrated structure of the touch rendering module and the touch module according to an embodiment of the present disclosure.
Figure 14:
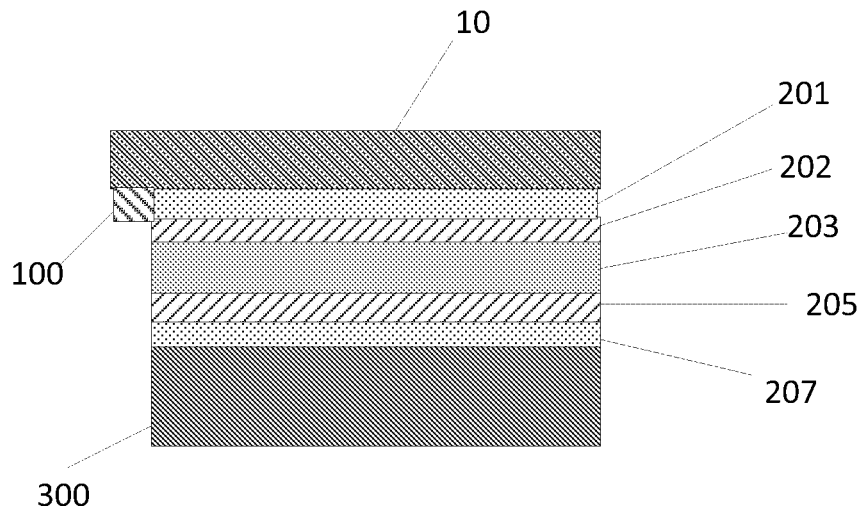
FIG. 14 is a fourth schematic diagram for the integrated structure of the touch rendering module and the touch module according to an embodiment of the present disclosure.

Referring to FIGS. 13 and 14, in this embodiment, the touch module includes a first optical adhesive layer 201, a first touch electrode 202, a first insulating layer 203, and a second touch electrode 205 arranged sequentially along a direction away from the cover plate 1.

The touch module is connected to the display module 300 via a third optical adhesive layer 207.

The first insulating layer 203 in FIG. 13 may be glass, and the first insulating layer 203 in FIG. 14 may be a PET film.

Figure 15:
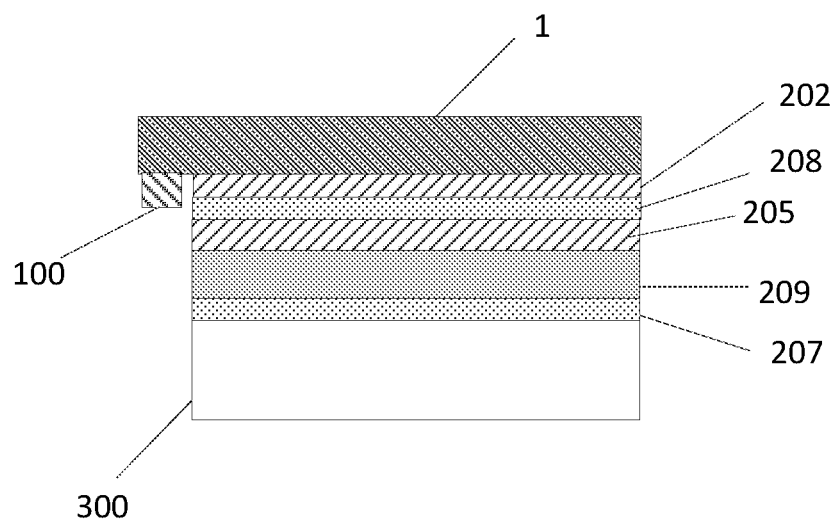
FIG. 15 is a fifth schematic diagram for the integrated structure of the touch rendering module and the touch module according to an embodiment of the present disclosure.

Referring to FIG. 15, in this embodiment, the touch module includes a first touch electrode 202, a fourth optical adhesive layer 208, a second touch electrode 205, and a third insulating layer 209 sequentially arranged along a direction away from the cover plate 1. The touch module is connected to the display module 300 through the third optical adhesive layer 207.

Figure 16:
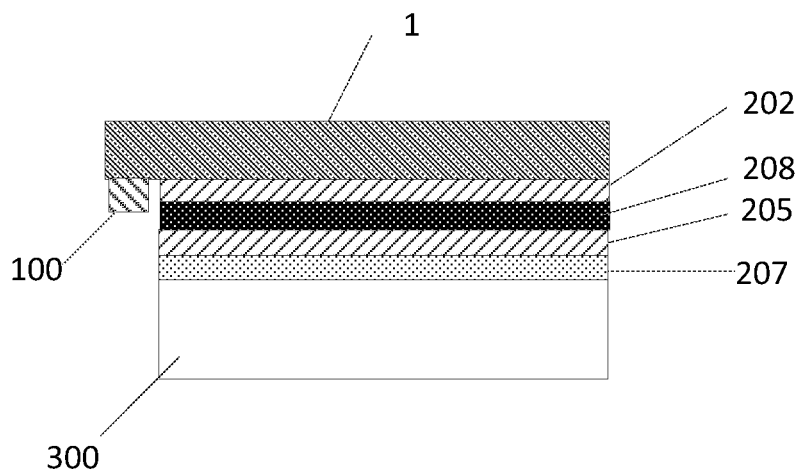
FIG. 16 is a sixth schematic diagram for the integrated structure of the touch rendering module and the touch module according to an embodiment of the present disclosure.

Referring to FIG. 16, the touch module includes a first touch electrode 202, a fourth insulating layer 208, and a second touch electrode 205 sequentially arranged along a direction away from the cover plate 1. The touch module is connected to the display module 300 through the third optical adhesive layer 207.

Figure 17:
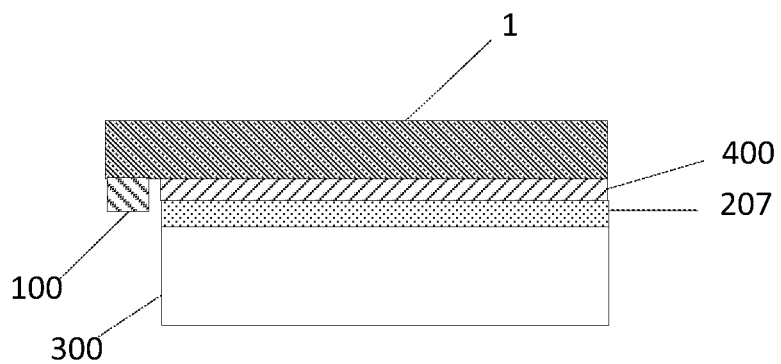
FIG. 17 is a seventh schematic diagram for the integrated structure of the touch rendering module and the touch module according to an embodiment of the present disclosure.
Figure 18:
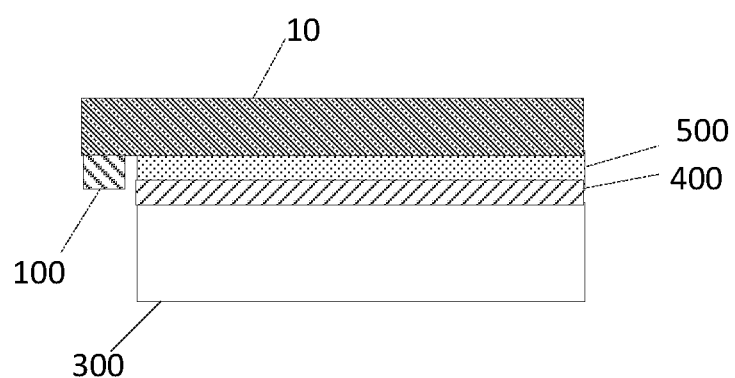
FIG. 18 is an eighth schematic diagram for the integrated structure of the touch rendering module and the touch module according to an embodiment of the present disclosure.
Figure 19:
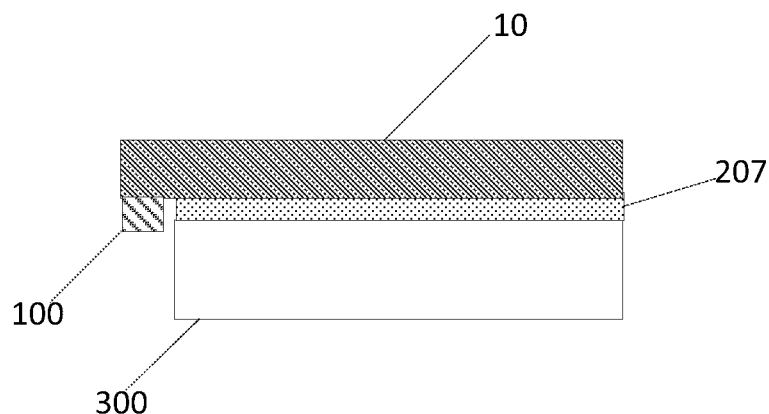
FIG. 19 is a ninth schematic diagram for the integrated structure of the touch rendering module and the touch module according to an embodiment of the present disclosure.

Referring to FIGS. 17 and 18, the touch module includes a touch electrode layer 400 arranged on the cover plate 1. the touch module is connected to the display module 300 via the third optical adhesive layer 207, and the touch electrode layer 400 is provided with a first touch electrode and a second touch electrode, i.e., the first touch electrode and the second touch electrode are provided on the same layer, and the first touch electrode and the second touch electrode are insulated from each other.

In FIG. 17, the touch electrode layer 400 is directly formed on the side of the cover plate 1 proximate to the display module 300, but the present disclosure is not limited thereto. For example, as shown in FIG. 18, the touch electrode layer 400 is connected to the cover plate 1 through a fifth optical adhesive layer 500.

The present disclosure further provides an operation method for the above-mentioned touch device, including the following steps:

vibrating, according to the initial driving voltage, the touch interface after the user performs the touch operation;

obtaining the touch position and the touch area, and generating the touch signal; and determining the changing trend of the touch area according to the touch signal, and generating the driving signal according to the changing trend of the touch area, to adjust the initial driving voltage to be the actual driving voltage.

Optionally, in this embodiment, the determining the changing trend of the touch area according to the touch signal, and generating the driving signal according to the changing trend of the touch area, to adjust the initial driving voltage to be the actual driving voltage includes:

determining the changing trend of the touch area according to the touch signal;

generating the driving signal according to the determination result of the determination unit, wherein when the determination result is that the changing trend of the touch area is increasing over time, and the touch area increases, the driving signal is generated, to enable the initial driving voltage to increase by a first preset value and be adjusted to be the actual driving voltage; when the determination result is that the changing trend of the touch area is increasing over time, and the touch area decreases, the driving signal is generated, to enable the initial driving voltage to decrease by a second preset value and be adjusted to be the actual driving voltage.

While the foregoing is directed to the preferred embodiment of the present disclosure, it will be understood by those skilled in the art that various modifications and improvements may be made without departing from the principles of the present disclosure, and such modifications and improvements shall also fall within the scope of the appended claims.

What is claimed is:

1. A touch device, comprising a touch rendering module, a touch module, a control module, and a driving module, wherein
the touch rendering module is configured for enabling, after a user performs a touch operation, a touch interface to vibrate according to an initial driving voltage;
the touch module is configured for obtaining a touch position and a touch area, and generating a touch signal; and
the control module is configured for determining a changing trend of the touch area according to the touch signal, and generating a driving signal according to the changing trend of the touch area, to adjust the initial driving voltage to be an actual driving voltage,
wherein the control module comprises:
a determination unit, configured for determining the changing trend of the touch area according to the touch signal;
a driving signal generating unit, configured for generating the driving signal according to the determination result of the determination unit, wherein when the determination result is that the changing trend of the touch area is increasing over time, and the touch area increases, the driving signal is generated, to enable the initial driving voltage to increase by a first preset value and be adjusted to be the actual driving voltage; when the determination result is that the changing trend of the touch area is increasing over time, and the touch area decreases, the driving signal is generated, to enable the initial driving voltage to decrease by a second preset value and be adjusted to be the actual driving voltage.

2. The touch device according to claim 1, wherein a vibration amplitude Am of the touch interface is obtained from a following formula: Am=B*Vac−C, wherein a driving voltage of the touch rendering module is Vac, and B and C are respective preset coefficients.

3. The touch device according to claim 2, wherein the actual driving voltage $V(t_2)$ is obtained from a following formula:

$$Vac(t_2)=E*(S1-S0)+Vac(t_1),$$

wherein $Vac(t_2)$ is a voltage value of Vac at a second moment $t_2$, $Vac(t_1)$ is a voltage value of Vac at a first moment $t_1$, D and E are respective preset coefficients, S0 represents a touch area at the first moment $t_1$, S1 represents a touch area at the second moment $t_2$, $t_2=t_1+n$ seconds, $t_1$ is a natural number, and n≥1.

4. The touch device according to claim 1, wherein a vibration amplitude Am of the touch interface is obtained through a following formula: Am=A*Vdc+B*Vac−C, wherein a driving voltage of the touch rendering module is Vdc+Vac, and A, B and C are preset coefficients.

5. The touch device according to claim 4, wherein the actual driving voltage $V(t_2)$ is obtained through following formulas:

$$V(t_2)=Vdc(t_2)+Vac(t_2);$$

$$Vdc(t_2)=D*(S1-S0)+Vdc(t_1);$$

$$Vac(t_2)=E*(S1-S0)+Vac(t_1),$$

wherein $Vdc(t_2)$ is a voltage value of the Vdc at the second moment $t_2$, $Vdc(t_1)$ is a voltage value of the Vdc at the first moment $t_1$, $Vac(t_2)$ is a voltage value of the Vac at the second moment $t_2$, $Vac(t_1)$ is a voltage value of the Vac at the first moment $t_1$, D and E are respective preset coefficients, S0 represents a touch area at the first moment $t_1$, S1 represents a touch area at the second moment $t_2$, $t_2=t_1+n$ seconds, $t_1$ is a natural number, and n≥1.

6. The touch device according to claim 1, comprising a touch screen, wherein the touch screen comprises a cover plate, and the touch module and the touch rendering module that are arranged on the cover plate, and the touch rendering module is arranged at at least one side of the touch module along a first direction.

7. The touch device according to claim 6, wherein the touch rendering module comprises a piezoelectric structure, the piezoelectric structure comprises a first electrode, a piezoelectric layer and a second electrode, and the first electrode, the piezoelectric layer and the second electrode are laminated sequentially in that order along a direction away from the cover plate.

8. The touch device according to claim 6, wherein the touch rendering module comprises a piezoelectric structure, the piezoelectric structure comprises a first electrode, a piezoelectric layer, a second electrode, and an insulating layer covering a side of the first electrode and the second electrode away from the cover plate, wherein the first electrode, the piezoelectric layer and the second electrode are laminated sequentially in that order along a direction away from the cover plate, an area of an orthographic projection of the first electrode onto the cover plate is greater than an area of an orthographic projection of the piezoelectric layer onto the cover plate, the area of the orthographic projection of the piezoelectric layer onto the cover plate is greater than an area of an orthographic projection of the second electrode onto the cover plate, the piezoelectric structure further comprises a first wire and a second wire, the first wire is connected to the first electrode through a via hole arranged in the insulating layer, and a second wire is connected to the second electrode through another via hole arranged in the insulating layer.

9. The touch device according to claim 6, wherein the plurality of touch rendering modules are arranged on the cover plate and spaced apart from each other along a second direction perpendicular to the first direction.

10. The touch device according to claim 6, further comprising a display module, wherein the touch module is integrated into the display module, or the touch module is arranged between the cover plate and the display module.

11. The touch device according to claim 6, wherein the touch module comprises a first optical adhesive layer, a first touch electrode, a first insulating layer, a second optical adhesive layer, a second touch electrode, and a second insulating layer that are arranged sequentially in that order along a direction away from the cover plate.

12. The touch device according to claim 6, wherein the touch module comprises a first optical adhesive layer, a first touch electrode, a first insulating layer, a second optical adhesive layer, and a second touch electrode that are arranged sequentially in that order along a direction away from the cover plate.

13. The touch device according to claim 6, wherein the touch module comprises a first touch electrode, a fourth optical adhesive layer, a second touch electrode, and a third insulating layer that are arranged sequentially in that order along a direction away from the cover plate.

14. The touch device according to claim 6, wherein the touch module comprises a first touch electrode, a fourth insulating layer, and a second touch electrode that are arranged sequentially in that order along a direction away from the cover plate.

15. The touch device according to claim 6, wherein the touch module comprises a touch electrode layer arranged on the cover plate.

16. An operation method for the touch device according to claim 1, comprising:
vibrating, according to the initial driving voltage, the touch interface after the user performs the touch operation;
obtaining the touch position and the touch area, and generating the touch signal; and
determining the changing trend of the touch area according to the touch signal, and generating the driving signal according to the changing trend of the touch area, to adjust the initial driving voltage to be the actual driving voltage.

17. The operation method according to claim 16, wherein the determining the changing trend of the touch area according to the touch signal, and generating the driving signal according to the changing trend of the touch area, to adjust the initial driving voltage to be the actual driving voltage comprises:
determining the changing trend of the touch area according to the touch signal;
generating the driving signal according to the determination result of the determination unit, wherein when the determination result is that the changing trend of the touch area is increasing over time, and the touch area increases, the driving signal is generated, to enable the initial driving voltage to increase by a first preset value and be adjusted to be the actual driving voltage; when the determination result is that the changing trend of the touch area is increasing over time, and the touch area decreases, the driving signal is generated, to enable the initial driving voltage to decrease by a second preset value and be adjusted to be the actual driving voltage.

18. The operation method according to claim 16, wherein a vibration amplitude Am of the touch interface is obtained from a following formula: $Am = B*Vac - C$, wherein a driving voltage of the touch rendering module is Vac, and B and C are respective preset coefficients.

19. The operation method according to claim 18, wherein the actual driving voltage $V(t_2)$ is obtained from a following formula:

$$Vac(t_2) = E*(S1 - S0) + Vac(t_1),$$

wherein $Vac(t_2)$ is a voltage value of Vac at a second moment $t_2$, $Vac(t_1)$ is a voltage value of Vac at a first moment $t_1$, D and E are respective preset coefficients, S0 represents a touch area at the first moment $t_1$, S1 represents a touch area at the second moment $t_2$, $t_2 = t_1 + n$ seconds, $t_1$ is a natural number, and $n \geq 1$.

* * * * *